(12) United States Patent
Soria et al.

(10) Patent No.: US 6,423,537 B1
(45) Date of Patent: Jul. 23, 2002

(54) MULTICHANNEL POROUS CERAMIC FIBER

(75) Inventors: Raymond Soria, Bazet; Jean-Claude Foulon, Saint Lezer; Jean-Michel Cayrey, Beaucens, all of (FR)

(73) Assignee: Societe des Ceramiques Techniques (FR)

( * ) Notice: Subject to any disclaimer, the term of this patent is extended or adjusted under 35 U.S.C. 154(b) by 0 days.

(21) Appl. No.: 09/273,250

(22) Filed: Mar. 19, 1999

(30) Foreign Application Priority Data

Mar. 20, 1998 (FR) .............................. 98 03489

(51) Int. Cl.$^7$ .............................. C12M 1/12
(52) U.S. Cl. .................. 435/297.1; 435/299.1; 55/523; 95/45; 96/8; 96/10; 210/321.78; 210/510.1
(58) Field of Search .............................. 55/523; 95/45, 95/54; 96/6, 8, 10; 210/321.78, 321.79, 321.8, 510.1; 435/293.1, 297.1, 297.5, 299.1, 299.2

(56) References Cited

U.S. PATENT DOCUMENTS

| 4,514,499 | A | * | 4/1985 | Noll .............................. 435/240 |
| 5,262,320 | A | * | 11/1993 | Stephanopoulos et al. ....... 435/240.23 |
| 5,270,207 | A | * | 12/1993 | Matsumura et al. ......... 435/285 |
| 5,454,947 | A | * | 10/1995 | Olapinski et al. ......... 210/510.1 |
| 5,607,586 | A | | 3/1997 | Grangeon et al. ..... 210/321.78 |
| 6,077,436 | A | * | 6/2000 | Rajnik et al. ................ 210/650 |

FOREIGN PATENT DOCUMENTS

| EP | 509275 B1 | 10/1992 | ........... B01D/71/02 |
| EP | 787524 A1 | 1/1997 | ........... B01D/63/06 |

* cited by examiner

*Primary Examiner*—David A. Redding
(74) *Attorney, Agent, or Firm*—Townsend and Townsend and Crew LLP

(57) ABSTRACT

A multi-channel porous ceramic fiber is provided, preferably having a particular geometry, together with a filtration and/or reaction module comprising such fibers and a precursor paste for the fiber comprising a compression binder as the extrusion binder.

69 Claims, 2 Drawing Sheets

MULTICHANNEL POROUS CERAMIC FIBER

BACKGROUND OF THE INVENTION

The present invention relates to a new type of ceramic membrane akin to (micro)fibers for microfiltration and ultrafiltration of fluids and for filtration and separation of gases, and to a method of manufacturing this membrane.

Membranes having a (micro)fiber geometry, in other words a tubular geometry with an outside diameter of up to 3 mm and an inside diameter comprised between 400 and 2000 μm are already known and available commercially. They are made of organic materials and have, because of this, the well-known advantages and disadvantages of these materials. Thus, if the mechanical characteristics of these (micro)fibers, and in particular their flexibility, allow them to be mounted in a filtration module, they nevertheless suffer from low chemical and heat resistance which limits their use to a temperature below 70° C. and a pH range comprised between about 4 and about 10.

Additionally, ceramic (micro)fibers already have been proposed. However, in all cases, these inorganic (micro)fibers typically adopt the conventional geometry of organic fibers. Moreover, the ceramic fibers currently known in the art may be useful for filtration, particularly due to their homogeneity, but these fibers typically are constituted of a single porous medium, acting both as the support (the fiber is self-supporting) and the filtering medium. This is unlike conventional systems of a larger size, which comprise a macroporous support coated with a porous filtering layer.

The current geometry of ceramic fibers currently known in the art nevertheless results in their having low mechanical strength. Additionally, manufacture and use of the ceramic fibers modules are difficult because the fibers have a tendency to break for different reasons, such as a sudden shock or pump vibration.

There thus exists a need for (micro)fibers which are strong and allow ready assembly into a module.

SUMMARY OF THE INVENTION

The aim of the present invention is thus to provide a multi-channel porous ceramic fiber.

This fiber corresponds to a porous ceramic bar which is perforated by several channels. The bar preferably is a porous ceramic material having a porous structure (in the conventional sense of the term) and a variable porosity. The axis of said channels preferably are parallel to the axis of the ceramic bar.

This fiber is constituted of a single porous medium, acting both as the support (the fiber is self-supporting) and the filtering medium. The channels that are crossing the fiber are exiting at each side of the fiber; these channels are non-communicating with the permeate side, except through their porosity. All these channels perform the same task (separating, reacting, etc.); none is used to transport permeate (or the result of fluid having crossed the wall of another channel.

According to one embodiment, the rank of the channels is at the maximum 2, i.e. one central channel and channels disposed around approximately according to a circle. The rank can also be only 1, in which case the channels are disposed approximately according to a circle.

According to one embodiment, the channels are distributed at the vertices of a regular polygon, the order of which is comprised between 3 and 6. In addition, a supplementary channel may occupy the center of the said polygon where the order is greater than 3, the order being preferably 5 or 6.

The fiber and/or the channels can have any suitable shape, for example a circular cross-section, a channel cross-sections in the shape of orange quarters, or other suitable shapes are possible. The same can apply to the fiber cross-section; a circular geometry can be replaced by a multi-lobe geometry or the like. In the case of an orange-quarter geometry (or where a channel is not circular), the diameter of such a channel will be defined as the diameter of a circular channel having the same cross-section. Where the fiber does not have a circular cross-section, the diameter of such a fiber is similarly defined as the diameter of a circular fiber having the same cross-section.

In accordance with a preferred embodiment, the fiber and/or the channels have a circular cross-section.

Preferably again, all the channels are substantially identical; this is a preferred way of limiting pressure drop and throughput differences from one channel to another along the fiber.

According to one embodiment, the fiber according to the invention has the following characteristics:

(i) a channel diameter comprised between about 150 and about 2000 μm, and more preferably between about 300 and about 1,000 μm; and/or (ii) an envelope ratio Re corresponding to the ratio of porous ceramic fiber diameter to channel diameter such that Re is comprised between about 2.5 and about 15, preferably between 4 and 10; and/or (iii) a fill ratio Ro corresponding to a ratio of the sum of channel cross-sections to porous ceramic fiber cross-section such that Ro is comprised between about 0.03 and about 0.45, preferably between about 0.04 and about 0.35 and advantageously between about 0.15 and about 0.35; and/or (iv) a sustain ratio Rs corresponding to a ratio between mean wall thickness measured along the radius of a fiber and the diameter of a channel passed through, said mean thickness corresponding to the mean of channel wall thickness located on a radius of said fiber passing through a maximum number of channels, such that Rs is comprised between about 0.3 and about 2.5, preferably between about 0.5 and about 1.5; and/or (v) a thickness ratio Rp corresponding to the ratio between channel wall thicknesses along a radius of the fiber passing through a maximum number of channels, such that Rp is comprised between about ⅓ and about 3, preferably between about ½ and about 2, thickness ratio Rp being advantageously about 1. According to another embodiment, this ratio is between about 2 and about 3.

Fiber diameter can extend up to, for example, about 25 mm, preferably up to about 15 mm; typically this diameter is comprised between about 2 and about 10 mm, preferably between about 3 and about 7 mm.

The fibers according to the invention have a crush resistance that is higher than that of the conventional (micro)fiber geometry. Thus, for equal filtration surfaces et/ou equal filtration flowrates, one gets the following breaking strength: for a monocanal fiber from 0,1 to 1N, for a fiber having four channels from 25 to 35N, for a fiber having seven channels from 60 to 100N.

DESCRIPTION OF THE SPECIFIC EMBODIMENTS

Figure 1:
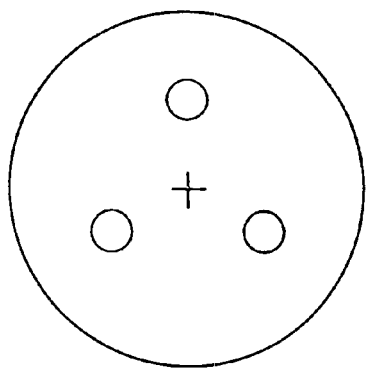
FIGS. 1–9 are top views of various embodiments of porous ceramic fibers.
Figure 2:
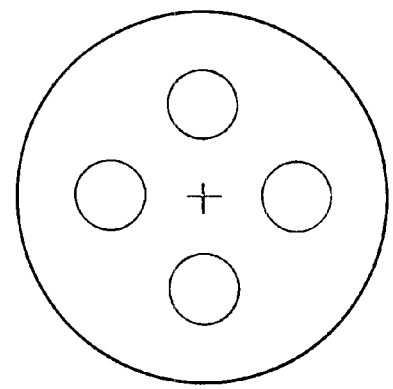
Figure 3:
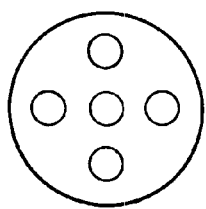
Figure 4:
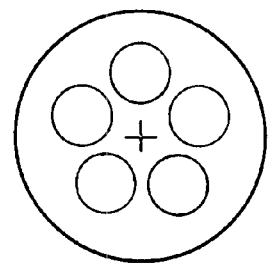
Figure 5:
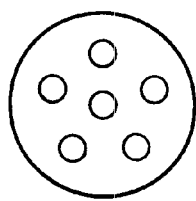
Figure 6:
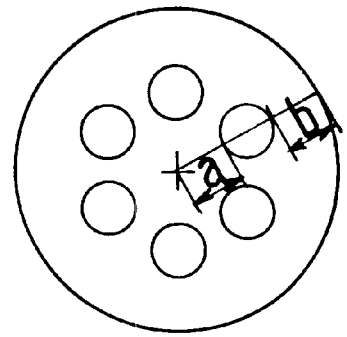
Figure 7:
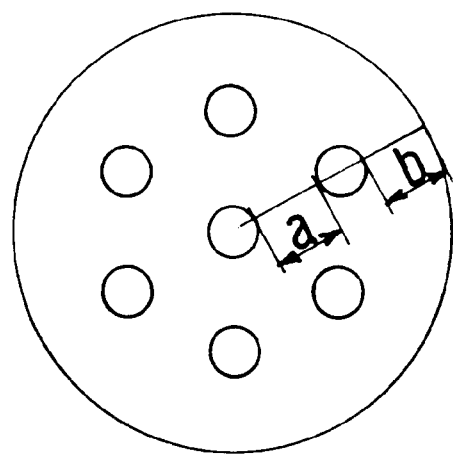
Figure 8:
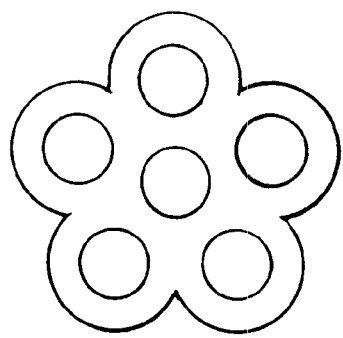
Figure 9:
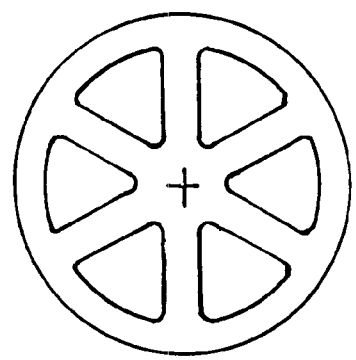

The geometry and parameters are explained in more detail with reference to the drawings in which FIGS. 1 to 9 show particular embodiments. The ratios between dimensions correspond to reality; the scale is chosen so that the diameter of the fiber that is the object of FIG. 7 is 4.5 mm. On FIGS. 6 and 7, measurement of mean thickness has been indicated. First, we consider a radius of the fiber passing through the maximum number of channels; next, we determine the lengths "a" and "b", such as indicated, these lengths corresponding to the channel wall thicknesses located on the said radius of the fiber. We take the mean (a+b)/2, and then divide this by the diameter of the channel through which the radius passes. This gets the sustain ratio Rs. Thickness ratio Rp is equal to a/b; in all the drawings, this ratio Rp preferably has a value of 1. This thickness ratio indicates the radial location of the channels (their distancing by a greater or lesser extent from the center of the fiber). For each embodiment shown by a figure, the conventional dimension values are indicated on the table below (in the column "No. of channels", n+m signifies n channels at the periphery and m central channels, channel and fiber diameter together with mean thickness being indicated in mm, while the cross-sectional areas of the channels and the fiber are given in $mm^2$).

According to another embodiment, the fiber is such that its pores are occupied, at least in part, by a catalyst. The catalyst is fixed in a conventional fashion in the pores of the fiber.

According to yet a further embodiment, the fiber is such that its pores are occupied, at least in part, by a bacteria, preferably immobilized. Bacteria are immobilized in a conventional fashion in the pores of the fiber.

Such fibers along with their catalyst or bacteria are suitable notably for use in chemical or biological reactions. For example, in the case of a bacteria, the solution to be treated comprises a nutrient, this solution passes through the fiber and the reaction products are recovered in the permeate. This embodiment makes it possible to couple bacterial confinement, biological reaction and product purification.

The invention additionally provides a filtration and/or reaction module comprising fibers according to the invention. In one embodiment, the module comprises a portion of the fibers that is employed for injecting a reaction gas.

This assembly of the fibers (with or without their immobilized bacteria) according to this latter embodiment, is advantageous, notably in the case of aerobic reactions. In effect, in certain cases, for example in the case of water treatment, reactions are of the aerobic type, and require permanent aeration of the liquid medium. The fibers accord-

TABLE

| FIG. | No. of channels | fiber diam. | channel diam. | Re | channel cross section | fiber cross section | Ro | mean thickness | Rs |
|---|---|---|---|---|---|---|---|---|---|
| 1 | 3 | 1.2–8 | 0.3–1 | 4–8 | 0.21–2.4 | 1.1–50.2 | 0.04–0.19 | 0.15–1.5 | 0.5–1.5 |
| 2 | 4 | 1.2–8 | 0.3–1 | 4–8 | 0.28–3.1 | 1.1–50.2 | 0.06–0.25 | 0.15–1.5 | 0.5–1.5 |
| 3 | 4 + 1 | 1.5–9 | 0.3–1 | 5–9 | 0.35–3.9 | 1.8–63.6 | 0.06–0.20 | 0.15–1.5 | 0.5–1.5 |
| 4 | 5 | 1.2–8 | 0.3–1 | 4–8 | 0.35–3.9 | 1.1–50.2 | 0.07–0.31 | 0.15–1.5 | 0.5–1.5 |
| 5 | 5 + 1 | 1.5–9 | 0.3–1 | 5–9 | 0.42–4.7 | 1.8–63.6 | 0.07–0.24 | 0.15–1.5 | 0.5–1.5 |
| 6 | 6 | 1.2–8 | 0.3–1 | 4–8 | 0.42–4.7 | 1.1–50.2 | 0.09–0.38 | 0.15–1.5 | 0.5–1.5 |
| 7 | 6 + 1 | 1.5–9 | 0.3–1 | 5–9 | 0.49–5.5 | 1.8–63.6 | 0.09–0.28 | 0.15–1.5 | 0.5–1.5 |
| 8 | 5 + 1 | 1.5–9 | 0.3–1 | 5–9 | 0.42–4.7 | 1.8–63.6 | 0.07–0.24 | 0.15–1.5 | 0.5–1.5 |
| 9 | 6 | 1.5–9 | 0.3–1 | 4–8 | 0.49–5.5 | 1.1–50.2 | 0.11–0.45 | 0.15–1.5 | 0.5–1.5 |

The fiber according to the present invention has a mean pore diameter that in general is less than 4 $\mu$m, conventionally comprised between 50 nm and 2 $\mu$m, preferably between 0.2 and 1.2 $\mu$m.

The fiber according to the invention has a mean porosity comprised between 10 and 70%, preferably between 35 and 60%.

The fibers according to the invention have a length which may reach several meters; conventionally, the length of a fiber is comprised between 0.5 and 2 m.

The camber of the fibers according to the invention or extent to which they are out of true (deformation due to sintering) is generally low, for example below 0.3%, preferably less than 0.15%, more advantageously less than 0.05%. This low value favors assembly of the fibers into a module.

Preferably, the ceramic is a metallic oxide.

The fibers according to the invention can be used for numerous applications, in their "as is" state or after modification.

According to one embodiment, the fiber is such that its pores are occupied, at least in part, by a zeolite, preferably of the silicalite type. Such fibers with their zeolite are suitable notably for gas separation. The zeolite is formed in situ in any conventional manner by impregnating a precursor solution followed by calcinating.

ing to the invention can be mounted in a module in such a way and that certain ones of them, arranged with a selected distribution, are employed for injecting air or oxygen: in this way, an aerated medium is obtained which is substantially homogeneous, perfectly suitable for biological reactions, notably aerobic. One can thus eliminate the steps consisting in forming slurries; additionally, the products obtained at the end of a reaction according to the invention can be used directly, for example in agriculture.

The module according to the invention can, in some cases, be named a membrane bio-reactor (MBR). This module can operate in several ways. For example, the reaction medium comprises the bacterial medium; here, the fibers now operate by extraction (the purified medium is extracted through the fiber lumen). This module can also operate with immobilized bacteria, the medium one is looking for then being obtained conventionally in the permeate.

The fibers according to the invention could also be employed for forming dispersions, such as gas/liquid, liquid/liquid (emulsions) or the like.

The invention also relates to a method for producing said fiber. This method is characterized by the sequence of three main steps:

(i) Preparation of an inorganic paste comprising an inorganic portion or filler, a binder and a solvent, with optionally a deflocculating agent and/or an extrusion agent;

(ii) shaping said paste by extrusion;

(iii) consolidating this shape by sintering.

The inorganic portion of said paste comprises particles of a mineral compound which, after sintering, will form the porous matrix (homogeneous in its volume). The mineral, preferably metallic, compound is either a non-oxide compound, or a metal oxide. In the case where this is a non-oxide derivative, a silicon or aluminium derivative will be chosen and preferably, silicon carbide, silicon nitride or aluminium nitride. Where the metallic compound is an oxide, this will be selected from oxides of aluminium, silicon or metals of groups IVA (titanium group) or VA (vanadium group) and will preferably be alumina, zirconium oxide or titanium oxide. These oxides can be used alone or in a mixture. The metallic compound has, for example, a mean particle diameter (measured by sedigraph) between and 0.15 and 2 µm, and preferably between 0.15 and 0.6 µm. The paste will contain between 50 and 90% by weight of this, and preferably between 65 and 85% by weight.

The organic binder gives the paste its necessary rheological properties needed for extrusion and its mechanical properties needed to obtain good cohesion of the product after extrusion. Said organic binder is preferably, but not obligatorily, a water-soluble polymer. The polymer will for example have, for a 2% by weight solution, a viscosity measured at 20° C. comprised between 4 and 10 Pa/s. This polymer can be selected from the celluloses and their derivatives (HEC, CMC, HPC, HPMC, etc.), one can also use a polyacrylic acid, polyethylene glycol, polyvinyl alcohol, etc. One can also use, as the binder, a binder that is conventionally used as a compression (or pressing) binder, rather than an extrusion binder, the terms "compression (or pressing) binder" and "extrusion binder" having their conventional sense known to the skilled person. A preferred binder is crystalline, notably a microcrystalline cellulose which will correspond in whole or in part to the binder. The paste will for example contain between 2 and 10% by weight of organic binder and preferably between 3 and 8% by weight.

The role of the solvent is to disperse the inorganic portion and the binder. Where a water-soluble polymer is employed, water will be selected as the solvent; where the polymer is not water-soluble, an alcohol, for example ethanol, will be chosen as solvent. The concentration of the solvent will be comprised between, for example, 8 and 40% by weight and, preferably, between 10 and 27% by weight.

A deflocculating agent that is soluble in the solvent will improve dispersion of the particles of the metal compound. Typically, a polyacrylic acid, a phospho-organic or alkylsulfonic acid is chosen. The deflocculating agent content is of the order of the 0.5 to 1% by weight.

In certain cases, an agent that aids extrusion such as a polyethylene glycol will be added. The extrusion agent content is of the order of 0.5 to 1% by weight.

The invention also relates to the precursor paste for the fiber, said paste comprising, dispersed in a solvent, an inorganic filler and a binder, this binder comprising a compression binder. This paste is the one described above.

Shaping is carried out conventionally using extrusion. Using a screw or piston, the paste is forced through a complex die in order to adopt the latter's geometry. The membranes preforms are collected at the outlet from the die, dried in free air in order to eliminate water or solvent, and are then sintered at a temperature comprised between 1,300 and 1,700° C. for, for example, two hours. Sintering is done under a normal or neutral atmosphere (for example argon) where the paste is metallic oxide-based, and under a neutral atmosphere (for example argon or helium) when the metallic compounds is a non-oxide.

The extrusion apparatus is conventional apparatus, specifically comprising a die with, arranged at the center thereof, a crown supporting the slugs which will form the channels. The fiber preforms obtained at the outlet from the extrusion apparatus can be dried and/or sintered in rotating barrels, for example using a technique described in French Patent 2,229,313 in the name of Ceraver.

The examples below illustrate the invention without limiting it. (The thickness ratio Rp is equal to 1 in these examples).

EXAMPLE 1

A ceramic paste was made by mixing an alumina of mean size 0.6 µm, a microcrystalline cellulose as the organic binder and water as the solvent phase. The paste concentration (in percentage by weight) was the following:

| | |
|---|---|
| Alumina | 77 |
| Microcrystalline cellulose | 5 |
| Water | 18. |

The paste was extruded using a piston press. After drying at 50° C. under rotation, and firing at 1,450° C. for two hours in a normal atmosphere, a porous fiber was obtained having a structure which is homogeneous in its volume, having a pore diameter of 0.3 µm and 23% porosity. Fiber and channels have a circular cross-section. The channels were arranged at the vertices of a polygon of order 6 with one channel at the center of the fiber. The diameter of the channels was 500 µm, and the diameter of the fiber 4.5 mm. The envelope ratio is consequently 9. The mean wall thickness between channels was measured along a radius of the fiber passing through the center of two channels. This mean thickness was 0.75 mm. The sustain ratio is 1.5. The cross-sectional surface area of the fiber was 15.90 mm$^2$, the total surface area of the channel cross-sections being 1.37 mm$^2$. The fill ratio was thus equal to 0.086.

The camber of this fiber was measured over a length of one meter. The value was 0.5 mm. Mechanical strength was measured by four-point bending with a 50 mm distance between the two points of support. The value obtained for the fiber was 100 N.

The porosity of this fiber was impregnated using an aqueous solution of silica and tetrapropyl ammonium hydroxide with a pH of 12. The impregnated fiber was placed in an autoclave the temperature of which was raised to 200° C. over 72 hours. After synthesis, a silicalite-type zeolite was obtained that had crystallized inside the pores of the porous fiber. This structure then had gas separation properties. Thus, when the fiber was supplied at ambient temperature with a mixture of hydrogen and methane in a 1:1 molar composition, a methane-enriched permeate was obtained the molar composition of which was 7 moles of hydrogen for 93 moles of methane equivalent to a selectivity of 13.

EXAMPLE 2

A ceramic paste was prepared by mixing a zirconia of mean size 0.15 µm, a hydroxypropyl cellulose as the organic binder and water as the solvent phase. The concentration of the paste was (in percentage by weight):

| | |
|---|---|
| Zirconia | 50 |
| Hydroxypropyl cellulose | 10 |
| Water | 40. |

The paste was extruded using a piston press. After drying at 30° C. and firing at 1,500° C. for two hours in a normal atmosphere, a porous fiber was obtained having a homogeneous structure in its volume, having a pore diameter of 0.1 $\mu$m and a porosity of 18%. The fiber and channels had a circular cross-section. The channels were arranged at the vertices of a polygon of order 4 with one channel at the center of the fiber. The diameter of the channels was 400 $\mu$m, and the diameter of the fiber 2.16 mm. The envelope ratio is consequently 5.4. The mean wall thickness between channels was measured along a radius of the fiber passing through the center of two channels. This mean thickness was 0.24 mm. The sustain ratio was 0.6. The cross-sectional surface area of the fiber was 3.66 mm$^2$, the total surface area of the channel cross-sections being 0.67 mm$^2$. The fill ratio was thus equal to 0.171.

The camber of this fiber was measured over a length of one meter. The value was 0.8 mm. Mechanical strength was measured by four-point bending with a 50 mm distance between the two points of support. The value obtained for the fiber was 60 N.

EXAMPLE 3

A ceramic paste was prepared by mixing a power of titanium oxide of size 2 $\mu$m, a microcrystalline cellulose as the organic binder and water as the solvent phase. A phospho-organic acid such as WITCO PS 65 was added to this mixture as a deflocculating agent. The concentration of the paste (in weight percent) was the following:

| | |
|---|---|
| Titanium oxide | 70 |
| Microcrystalline cellulose | 3 |
| Water | 26.5 |
| WITCO PS65 | 0.5. |

The paste was shaped using a screw extruder. After drying at ambient temperature and firing at 1,300° C. for 3 hours in an argon atmosphere, a porous fiber was obtained having a structure which was homogeneous in its volume and with a 1.3 $\mu$m pore diameter and a porosity of 30%. The fiber and channels had a circular cross-section. The channels were arranged at the vertices of a polygon of order 5 with one channel at the center of the fiber. The diameter of the channels was 300 $\mu$m, and the diameter of the fiber 2.1 mm. The envelope ratio is consequently 7. The mean wall thickness between channels was measured along a radius of the fiber passing through the center of two channels. This mean thickness was 0.3 mm. The sustain ratio was 1.0. The cross-sectional surface area of the fiber was 3.46 mm$^2$, the total surface area of the channel cross-sections being 0.42 mm$^2$. The fill ratio was thus equal to 0.122.

The camber of this fiber was measured over a length of two meters. The value was 0.6 mm. Mechanical strength was measured by four-point bending with a 50 mm distance between the two points of support. The value obtained for the fiber was 83 N.

Bacteria were immobilized in the porosity of the fiber. The bacteria were supplied through the inner channels using a nutrient solution that they were transforming. The reaction products were recovered in the permeate.

EXAMPLE 4

A ceramic paste was prepared by mixing silica of mean size 0.4 $\mu$m, a polyvinyl alcohol as the organic binder and water as the solvent phase. The paste also included PEG 4,000 as the plastifier. Concentration in the paste (as a percentage by weight) was the following:

| | |
|---|---|
| Silica | 65 |
| Polyvinyl alcohol | 9 |
| Water | 25 |
| PEG 4,000 | 1 |

The paste was extruded using a piston press. After drying at 30° C. in a constantly-rotating barrel and firing at 1,430° C. for 5 hours in a normal atmosphere, a porous fiber was obtained having a structure which was homogeneous in its volume and with a 0.3 $\mu$m pore diameter and a porosity of 20%. The fiber and channels had a circular cross-section. The channels were arranged at the vertices of a polygon of order 5 without a channel at the center of the fiber. The diameter of the channels was 700 $\mu$m, and the diameter of the fiber 2.8 mm. The envelope ratio is consequently 4. The mean wall thickness between channels was measured along a radius of the fiber passing through the center of a channel. This mean thickness was 0.35 mm. The sustain ratio was 0.5. The cross-sectional surface area of the fiber was 6.16 mm$^2$, the total surface area of the channel cross-sections being 1.92 mm$^2$. The fill ratio was thus equal to 0.313.

The camber of this fiber was measured over a length of 1 meter. The value was 0.2 mm. Mechanical strength was measured by four-point bending with a 50 mm distance between the two points of support. The value obtained for the fiber was 65 N.

EXAMPLE 5

A ceramic paste was prepared by mixing an oxide of vanadium of mean size 1.7 $\mu$m, a polyacrylic acid as organic binder and water as the solvent phase. The concentration of the paste (in percentage by weight) was the following:

| | |
|---|---|
| Vanadium oxide | 83 |
| Polyacrylic acid | 5 |
| Water | 12. |

The paste was shaped using a piston press. After drying at 50° C. and firing at 1,600° C. for 2 hours in a normal atmosphere, a porous fiber was obtained having a structure which was homogeneous in its volume and with a 1.1 $\mu$m pore diameter and a porosity of 26%. The fiber and channels had a circular cross-section. The channels were arranged at the vertices of a polygon of order 6 without a channel at the center of the fiber. The diameter of the channels was 300 $\mu$m, and the diameter of the fiber 1.8 mm. The envelope ratio is consequently 6. The mean wall thickness between channels was measured along a radius of the fiber passing through the center of a channel. This mean thickness was 0.3 mm. The sustain ratio was 1. The cross-sectional surface area of the fiber was 2.54 mm$^2$, the total surface area of the channel cross-sections being 0.42 mm$^2$. The fill ratio was thus equal to 0.167.

The camber of this fiber was measured over a length of 1 meter. The value was 0.9 mm. Mechanical strength was measured by four-point bending with a 50 mm distance between the two points of support. The value obtained for the fiber was 72 N.

EXAMPLE 6

A ceramic paste was prepared by mixing a powder of silicon carbide of mean size 1 μm, an ethyl cellulose as an organic binder and ethanol as the solvent phase. The concentration in the paste (in percentage by weight) was the following:

| | |
|---|---|
| Silicon carbide | 90 |
| Ethyl cellulose | 2 |
| Ethanol | 8 |

The paste was shaped using a screw extruder. After drying at 50° C. and firing at 1,700° C. for 3 hours in an argon atmosphere, a porous fiber was obtained having a structure which was homogeneous in its volume and with a 0.7 μm pore diameter and a porosity of 25%. The fiber and channels had a circular cross-section. The channels were arranged at the vertices of a polygon of order 4 without a channel at the center of the fiber. The diameter of the channels was 800 μm, and the diameter of the fiber 4.16 mm. The envelope ratio is consequently 5.2. The mean wall thickness between channels was measured along a radius of the fiber passing through the center of a channel. This mean thickness was 0.64 mm. The sustain ratio was 0.8. The cross-sectional surface area of the fiber was 13.59 $mm^2$, the total surface area of the channel cross-sections being 2.01 $mm^2$. The fill ratio was thus equal to 0.148.

The camber of this fiber was measured over a length of 1 meter. The value was 0.4 mm. Mechanical strength was measured by four-point bending with a 50 mm distance between the two points of support. The value obtained for the fiber was 35 N.

A membrane biological reactor was constructed using these fibers. This was achieved by providing a rectangular cross-section cartridge so as to obtain five rows of 200 fibers by immobilizing the ends of the fibers in an epoxy-type resin. One of the two ends of this cartridge was completely closed. The other end was fitted with a device making it possible, firstly, to recover liquid originating from the channels and secondly, to inject air inside the channels. The proportion of liquid-recovery fibers to gas-injection fibers was 20:1. This cartridge was placed in a reservoir containing effluent for purification and bacteria, the reservoir being continuously fed. The liquid-recovery fibers allowed continuous extraction of the liquid, and at a rate equivalent to the supply to the tank. The gas-injection fibers created a cloud of air bubbles in the reservoir making it possible, firstly, to clean the liquid-recovery fibers and, secondly, to maintain optimum conditions for the bacterial flora.

EXAMPLE 7

A ceramic paste was prepared by mixing a powder of alumina nitride of mean size of 0.6 μm, and ethyl cellulose as the organic binder and ethanol as the solvent phase. Concentration in the paste (in percentage by weight) was the following:

| | |
|---|---|
| Alumina nitride | 85 |
| Ethyl cellulose | 5 |
| Ethanol | 10 |

The paste was extruded using a piston press. After drying at 50° C. and firing at 1,300° C. for 2 hours in a normal atmosphere, a porous fiber was obtained having a structure which was homogeneous in its volume and with a 0.5 μm pore diameter and a porosity of 22%. The fiber and channels had a circular cross-section. The channels were arranged at the vertices of a polygon of order 4 with a channel at the center of the fiber. The diameter of the channels was 700 μm, and the diameter of the fiber 3.5 mm. The envelope ratio is consequently 5. The mean wall thickness between channels was measured along a radius of the fiber passing through the center of a channel. This mean thickness was 0.35 mm. The sustain ratio was 0.5. The cross-sectional surface area of the fiber was 9.62 $mm^2$, the total surface area of the channel cross-sections being 1.92 $mm^2$. The fill ratio was thus equal to 0.2.

The camber of this fiber was measured over a length of 1 meter. The value was 0.2 mm. Mechanical strength was measured by four-point bending with a 50 mm distance between the two points of support. The value obtained for the fiber was 57,5 N.

EXAMPLE 8

A ceramic paste was prepared by mixing a powder of silicon nitride of mean size 0.8 μm, a carboxy methyl cellulose as the organic binder and water as the solvent phase. Concentration in the paste (in percentage by weight) was the following:

| | |
|---|---|
| Silicon nitride | 65 |
| Carboxy methyl cellulose | 6 |
| Water | 32 |

The paste was extruded using a piston press. After drying at 30° C. and firing at 1,500° C. for 4 hours in a normal atmosphere, a porous fiber was obtained having a structure which was homogeneous in its volume and with a 0.4 μm pore diameter and a porosity of 20%. The fiber and channels had a circular cross-section. The channels were arranged at the vertices of a polygon of order 3 without a channel at the center of the fiber. The diameter of the channels was 1000 μm, and the diameter of the fiber 8 mm. The envelope ratio is consequently 8. The mean wall thickness between channels was measured along a radius of the fiber passing through the center of a channel. This mean thickness was 1.5 mm. The sustain ratio was 1.5. The cross-sectional surface area of the fiber was 50.27 $mm^2$, the total surface area of the channel cross-sections being 2.36 $mm^2$. The fill ratio was thus equal to 0.047.

The camber of this fiber was measured over a length of 1 meter. The value was 1 mm. Mechanical strength was measured by four-point bending with a 50 mm distance between the two points of support. The value obtained for the fiber was 25 N.

EXAMPLE 9

The same paste as that described in example 1 was used. Drying and firing were performed under the same conditions. A porous fiber having a structure which was homogeneous in its volume was obtained having a pore diameter of 0.3 µm and a porosity of 23%. The fiber had a multi-lobe cross-section, and the channels had a circular cross-section. The channels were arranged at the vertices of a polygon of order 5 with a channel at the center of the fiber. The diameter of the channels was 700 µm, and the diameter of the fiber 3.2 mm. The envelope ratio is consequently 4.6. The mean wall thickness between channels was measured along a radius of the fiber passing through the center of a channel. This mean thickness was 0.35 mm. The sustain ratio was 0.5. The cross-sectional surface area of the fiber was 7.82 mm$^2$, the total surface area of the channel cross-sections being 2.31 mm$^2$. The fill ratio was thus equal to 0.295.

The camber of this fiber was measured over a length of 1 meter. The value was 0.3 mm. Mechanical strength was measured by four-point bending with a 50 mm distance between the two points of support. The value obtained for the fiber was 95 N.

EXAMPLE 10

The same paste as that described in example 3 was used. Drying and firing were performed under the same conditions. A porous fiber having a structure which was homogeneous in its volume was obtained having a pore diameter of 1.3 µm and a porosity of 30%. The fiber had a circular cross-section, and the channels had a cross-section in the shape of orange quarters. The channels were arranged at the vertices of a polygon of order 6 without a channel at the center of the fiber. The diameter of the channels was 800 µm, and the diameter of the fiber 3.6 mm. The envelope ratio is consequently 4.5. The mean wall thickness between channels was measured along a radius of the fiber passing through the center of a channel. This mean thickness was 0.4 mm. The sustain ratio was 0.5. The cross-sectional surface area of the fiber was 9.62 mm$^2$, the total surface area of the channel cross-sections being 3.46 mm$^2$. The fill ratio was thus equal to 0.36.

The camber of this fiber was measured over a length of 1 meter. The value was 0.3 mm. Mechanical strength was measured by four-point bending with a 50 mm distance between the two points of support. The value obtained for the fiber was 73 N.

The invention is not limited to the embodiments described but may be subject to numerous variations readily accessible to those skilled in the art.

What is claimed is:

1. A multi-channel porous ceramic fiber in which the channel diameter is comprised between 150 and 1,000 µm.

2. The fiber according to claim 1, in which the channels are distributed at the vertices of a regular polygon the order of which is comprised between 3 and 6, a supplementary channel being able to occupy the center of the said polygon where the order is greater than 3.

3. The fiber according to claim 2, in which the order is preferably 5 or 6.

4. The fiber according to claim 1, in which the channel diameter is comprised between 300 and 1,000 µm.

5. The fiber according to claim 1, in which an envelope ratio Re corresponding to the ratio of porous ceramic fiber diameter to channel diameter is such that Re is comprised between 2.5 and 15.

6. The fiber according to claim 5, in which envelope ratio Re is comprised between 4 and 10.

7. The fiber according to claim 1, in which a fill ratio Ro corresponding to a ratio of the sum of channel cross-sections to porous ceramic fiber cross-section is such that Ro is comprised between the 0.03 and 0.45.

8. The fiber according to claim 7, in which fill ratio Ro is comprised between 0.04 and 0.35.

9. The fiber according to claim 8, in which fill ratio Ro is comprised between 0.15 and 0.35.

10. The fiber according to claim 1, in which a sustain ratio Rs corresponding to a ratio between mean wall thickness measured along the radius of a fiber and the diameter of a channel passed through, said mean thickness corresponding to the mean of channel wall thickness located on a radius of said fiber passing through a maximum number of channels, is such that Rs is comprised between 0.3 and 2.5.

11. The fiber according to claim 10, in which the sustain ratio Rs is comprised between 0.5 at 1.5.

12. The fiber according to claim 1, in which a thickness ratio Rp corresponding to the ratio between channel wall thicknesses along a radius of the fiber passing through a maximum number of channels, is such that Rp is comprised between ⅓ and 3.

13. The fiber according to claim 12, in which thickness ratio Rp is comprised between ½ and 2.

14. The fiber according to claim 13, in which thickness ratio Rp is about 1.

15. The fiber according to claim 1, having a mean pore diameter comprised between 50 nm and 2 µm.

16. The fiber according to claim 15, having a mean pore diameter comprised between 0.2 and 1.2 µm.

17. The fiber according to claim 1, having a mean porosity comprised between 10 and 70%.

18. The fiber according to claim 17, having a mean porosity comprised between 35 and 60%.

19. The fiber according to claim 1, that is out of true by less than 0.3%.

20. The fiber according to claim 19, that is out of true by less than 0.15%.

21. The fiber according to claim 20, that is out of true by less than a 0.05%.

22. The fiber according to claim 1, it which said fiber and/or said channels have a circular cross-section.

23. The fiber according to claim 1, in which all said channels are substantially identical.

24. The fiber according to claim 1, in which said ceramic is a metallic oxide.

25. The fiber according to claim 1, in which the pores are occupied, at least partly, by a zeolite.

26. The fiber according to claim 25, in which said zeolite is of the silicalite type.

27. The fiber according to claim 1, in which the pores are occupied, at least in part, by a catalyst.

28. The fiber according to claim 1, the pores of which are occupied, at least in part, by a bacteria.

29. The fiber according to claim 28, in which said bacteria is immobilized.

30. A filtration and/or reaction module comprising fibers according to claim 28, in which a part of said fibers is employed for injecting a reactional gas.

31. A filtration and/or reaction module comprising fibers according to claim 1.

32. The filtration and/or reaction module according to claim 31, in which a part of said fibers is employed for injecting a reactional gas.

33. A multi-channel porous ceramic fiber, in which the channels are distributed at the vertices of a regular polygon the order of which is comprised between 3 and 6, a supplementary channel being able to occupy the center of the said polygon where the order is greater than 3, where the channel diameter is comprised between 300 and 1,000 µm, an envelope ratio Re corresponding to the ratio of porous ceramic fiber diameter to channel diameter is such that Re is comprised between 4 and 10, a fill ratio Ro corresponding to a ratio of the sum of channel cross-sections to porous ceramic fiber cross-section is such that Ro is comprised between 0.04 and 0.35, a sustain ratio Rs corresponding to a ratio between mean wall thickness measured along the radius of a fiber and the diameter of a channel passed through, said mean thickness corresponding to the mean of channel wall thickness located on a radius of said fiber passing through a maximum number of channels, is such that Rs is comprised between 0.5 at 1.5, a thickness ratio Rp corresponding to the ratio between channel wall thickness along a radius of the fiber passing through a maximum number of channels, is such that Rp is comprised between ½ and 2.

34. The fiber according to claim 33, having a diameter comprised between 2 and 10 mm.

35. The fiber according to claim 34, having a diameter comprised between 3 and 7 mm.

36. The fiber according to claim 33, having a diameter comprised between 3 and 7 mm, a mean pore diameter comprised between 0.2 at 1.2 μm, and a mean porosity comprised between 35 and 60%.

37. A multi-channel porous ceramic fiber having a diameter comprised between 2 and 10 mm.

38. The fiber according to claim 37, having a diameter comprised between 3 and 7 mm.

39. The fiber according to claim 37, having a mean pore diameter comprised between 50 nm and 2 μm.

40. The fiber according to claim 39, having a mean pore diameter comprised between 0.2 at 1.2 μm.

41. The fiber according to claim 37, having a mean porosity comprised between 10 and 70%.

42. The fiber according to claim 41, having a mean porosity comprised between 35 and 60%.

43. The fiber according to claim 37, that is out of true by less than 0.3%.

44. The fiber according to claim 43, that is out of true by less than 0.05%.

45. The fiber according to claim 37, it which said fiber and/or said channels have a circular cross-section.

46. The fiber according to claim 37, in which all said channels are substantially identical.

47. The fiber according to claim 37, in which said ceramic is a metallic oxide.

48. The fiber according to claim 37, in which the pores are occupied, at least partly, by a zeolite.

49. The fiber according to claim 48, in which said zeolite is of the silicalite type.

50. The fiber according to claim 37, in which the pores are occupied, at least in part, by a catalyst.

51. The fiber according to claim 37, the pores of which are occupied, at least in part, by a bacteria.

52. The fiber according to claim 51, in which said bacteria is immobilized.

53. A filtration and/or reaction module comprising fibers according to claim 51, in which a part of said fibers is employed for injecting a reactional gas.

54. A filtration and/or reaction module comprising fibers according to claim 37.

55. The filtration and/or reaction module according to claim 54, in which a part of said fibers is employed for injecting a reactional gas.

56. The fiber according to claim 37, in which the channels are distributed at the vertices of a regular polygon the order of which is comprised between 3 and 6, a supplementary channel being able to occupy the center of the said polygon where the order is greater than 3.

57. The fiber according to claim 56, in which the order is preferably 5 or 6.

58. The fiber according to claim 56, in which the channel diameter is comprised between 300 and 1,000 μm.

59. The fiber according to claim 56, in which an envelope ratio Re corresponding to the ratio of porous ceramic fiber diameter to channel diameter is such that Re is comprised between 2.5 and 15.

60. The fiber according to claim 59, in which envelope ratio Re is comprised between 4 and 10.

61. The fiber according to claim 56, in which a fill ratio Ro corresponding to a ratio of the sum of channel cross-sections to porous ceramic fiber cross-section is such that Ro is comprised between the 0.03 and 0.45.

62. The fiber according to claim 61, in which fill ratio Ro is comprised between 0.04 and 0.35.

63. The fiber according to claim 62, in which fill ratio Ro is comprised between 0.15 and 0.35.

64. (New) The fiber according to claim 56, in which a sustain ratio Rs corresponding to a ratio between mean wall thickness measured along the radius of a fiber and the diameter of a channel passed through, said mean thickness corresponding to the mean of channel wall thickness located on a radius of said fiber passing through a maximum number of channels, is such that Rs is comprised between 0.3 and 2.5.

65. The fiber according to claim 64, in which the sustain ratio Rs is comprised between 0.5 at 1.5.

66. The fiber according to claim 56, in which a thickness ratio Rp corresponding to the ratio between channel wall thicknesses along a radius of the fiber passing through a maximum number of channels, is such that Rp is comprised between ⅓ and 3.

67. The fiber according to claim 66, in which thickness ratio Rp is comprised between ½ and 2.

68. The fiber according to claim 67, in which thickness ratio Rp is about 1.

69. A multi-channel porous ceramic fiber, in which the channels are distributed at the vertices of a regular polygon the order of which is comprised between 3 and 6, a supplementary channel being able to occupy the center of the said polygon where the order is greater than 3, where said fiber has a diameter comprised between 2 and 10 mm, an envelope ratio Re corresponding to the ratio of porous ceramic fiber diameter to channel diameter is such that Re is comprised between 4 and 10, a fill ratio Ro corresponding to a ratio of the sum of channel cross-sections to porous ceramic fiber cross-section is such that Ro is comprised between 0.04 and 0.35, a sustain ratio Rs corresponding to a ratio between mean wall thickness measured along the radius of a fiber and the diameter of a channel passed through, said mean thickness corresponding to the mean of channel wall thickness located on a radius of said fiber passing through a maximum number of channels, is such that Rs is comprised between 0.5 at 1.5, a thickness ratio Rp corresponding to the ratio between channel wall thicknesses along a radius of the fiber passing through a maximum number of channels, is such that Rp is comprised between ½ and 2.

\* \* \* \* \*

UNITED STATES PATENT AND TRADEMARK OFFICE
CERTIFICATE OF CORRECTION

PATENT NO. : 6,423,537 B1 Page 1 of 1
DATED : July 23, 2002
INVENTOR(S) : Raymond Soria, Jean-Claude Foulon and Jean-Michel Cayrey It is certified that error appears in the above-identified patent and that said Letters Patent is hereby corrected as shown below:

<u>Column 14,</u>
Line 18, the term "(New)" should be deleted.

Signed and Sealed this

Fourth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,423,537 B1
DATED : July 23, 2002
INVENTOR(S) : Raymond Soria, Jean-Claude Foulon and Jean-Michel Cayrey It is certified that error appears in the above-identified patent and that said Letters Patent is hereby corrected as shown below:

Column 1,
Line 59, a right parenthesis -- (")") -- should be inserted before the period.

Column 2,
Line 59, the "surfaces et/ou equal" should read -- surfaces and/or equal --.
Line 61, the "from 0,1 to 1N," should read -- from 0.1 to 1N, --.

Column 7,
Line 31, the "mixing a power of" should read -- mixing a powder of --.

Column 10,
Line 28, the "fiber was 57,5N." should read -- the fiber was 57.5N. --.

Column 12,
Line 32, the "it which said fiber" should read -- in which said fiber --.

Column 13,
Line 35, the "it which said fiber" should read -- in which said fiber --.

Signed and Sealed this

Eleventh Day of March, 2003

JAMES E. ROGAN
*Director of the United States Patent and Trademark Office*